US012658996B2

(12) United States Patent
Radulescu et al.

(10) Patent No.: US 12,658,996 B2
(45) Date of Patent: Jun. 16, 2026

(54) CHANNEL STATE INFORMATION DECODING

(71) Applicant: QUALCOMM Incorporated, San Diego, CA (US)

(72) Inventors: Andrei Dragos Radulescu, La Jolla, CA (US); Rakesh Dugad, Basking Ridge, NJ (US); Saurabh Shandilya, New Delhi (IN); Doohyun Sung, Basking Ridge, NJ (US); Raja Sekhar Bachu, Kendall Park, NJ (US); Yaniv Elgarisi, San Diego, CA (US); Lior Uziel, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 18/260,203

(22) PCT Filed: Feb. 3, 2022

(86) PCT No.: PCT/US2022/070498
§ 371 (c)(1),
(2) Date: Jun. 30, 2023

(87) PCT Pub. No.: WO2022/170331
PCT Pub. Date: Sep. 11, 2022

(65) Prior Publication Data
US 2024/0297698 A1 Sep. 5, 2024

(30) Foreign Application Priority Data
Feb. 3, 2021 (IN) .............................. 202111004629

(51) Int. Cl.
*H04B 7/06* (2006.01)
*H04L 1/00* (2006.01)

(52) U.S. Cl.
CPC ......... *H04B 7/0626* (2013.01); *H04B 7/0641* (2013.01); *H04L 1/0026* (2013.01)

(58) Field of Classification Search
CPC .... H04B 7/0626; H04B 7/0641; H04L 1/0026
(Continued)

(56) References Cited

U.S. PATENT DOCUMENTS 11,159,222 B2 10/2021 Yang et al.
11,211,978 B2 12/2021 Wu
(Continued)

FOREIGN PATENT DOCUMENTS

EP 3982665 A1 4/2022
WO 2019168738 9/2019
(Continued)

OTHER PUBLICATIONS

CATT: "Details on Type II CSI Enhancement", 3GPP TSG RAN WG1 Meeting #97, 3GPP Draft, R1-1906344, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, 12 Pages, May 13, 2019 (May 13, 2019), XP051727794.
(Continued)

*Primary Examiner* — Kwang B Yao
*Assistant Examiner* — Bradley D Lytle, Jr.
(74) *Attorney, Agent, or Firm* — Paul M. McAdams; Harrity & Harrity, LLP

(57) ABSTRACT

Various aspects of the present disclosure generally relate to wireless communication. In some aspects, a base station may receive, from a user equipment and at a physical layer entity of the base station, channel state information (CSI) that includes a CSI part 1 and a CSI part 2, the CSI part 1 having a length known to the base station and the CSI part 2 having a length that is based at least in part on a payload
(Continued)

of the CSI part 1. The base station may decode, at the physical layer entity of the base station, a payload of the CSI part 2 based at least in part on a payload of the CSI part 1 and one or more parameters indicated by a medium access control (MAC) layer entity of the base station. Numerous other aspects are described.

30 Claims, 10 Drawing Sheets

(58) Field of Classification Search
USPC ........ 370/252, 330, 332, 350, 342; 455/501, 455/522
See application file for complete search history.

(56) References Cited

U.S. PATENT DOCUMENTS

| | | | |
|---|---|---|---|
| 11,258,568 B2 | 2/2022 | Wu et al. | |
| 11,470,598 B2 | 10/2022 | Xu et al. | |
| 2019/0053226 A1* | 2/2019 | Xiong | H04L 1/08 |
| 2019/0141677 A1* | 5/2019 | Harrison | H04W 72/04 |
| 2021/0067995 A1* | 3/2021 | Hao | H04W 24/10 |
| 2022/0240255 A1* | 7/2022 | Matsumura | H04B 7/063 |

FOREIGN PATENT DOCUMENTS

| | | |
|---|---|---|
| WO | 2019192013 | 10/2019 |
| WO | 2020250289 A1 | 12/2020 |

OTHER PUBLICATIONS

International Search Report and Written Opinion—PCT/US2022/070498—ISA/EPO—May 17, 2022.

* cited by examiner

400

405
Transmit reference signal(s)

410
Measure reference signal(s) and generate CSI

UE

415
Receive CSI

420
Decode CSI part 1 and CSI part 2

Base Station

600

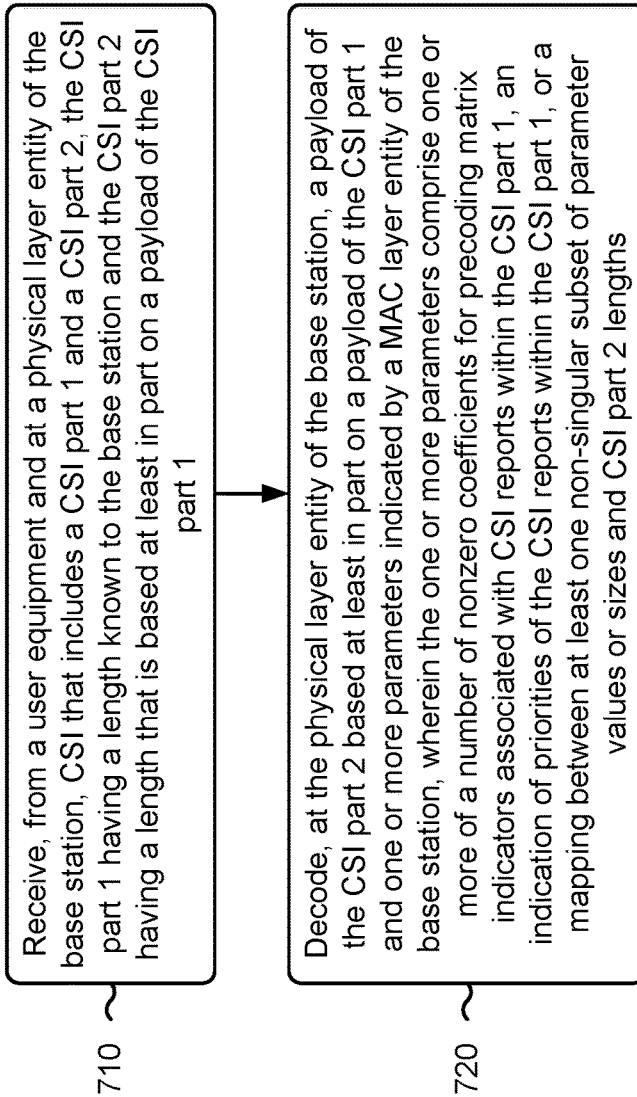

Receive, from a user equipment and at a physical layer entity of the base station, CSI that includes a CSI part 1 and a CSI part 2, the CSI part 1 having a length known to the base station and the CSI part 2 having a length that is based at least in part on a payload of the CSI part 1

710

Decode, at the physical layer entity of the base station, a payload of the CSI part 2 based at least in part on a payload of the CSI part 1 and one or more parameters indicated by a MAC layer entity of the base station, wherein the one or more parameters comprise one or more of a number of nonzero coefficients for precoding matrix indicators associated with CSI reports within the CSI part 1, an indication of priorities of the CSI reports within the CSI part 1, or a mapping between at least one non-singular subset of parameter values or sizes and CSI part 2 lengths

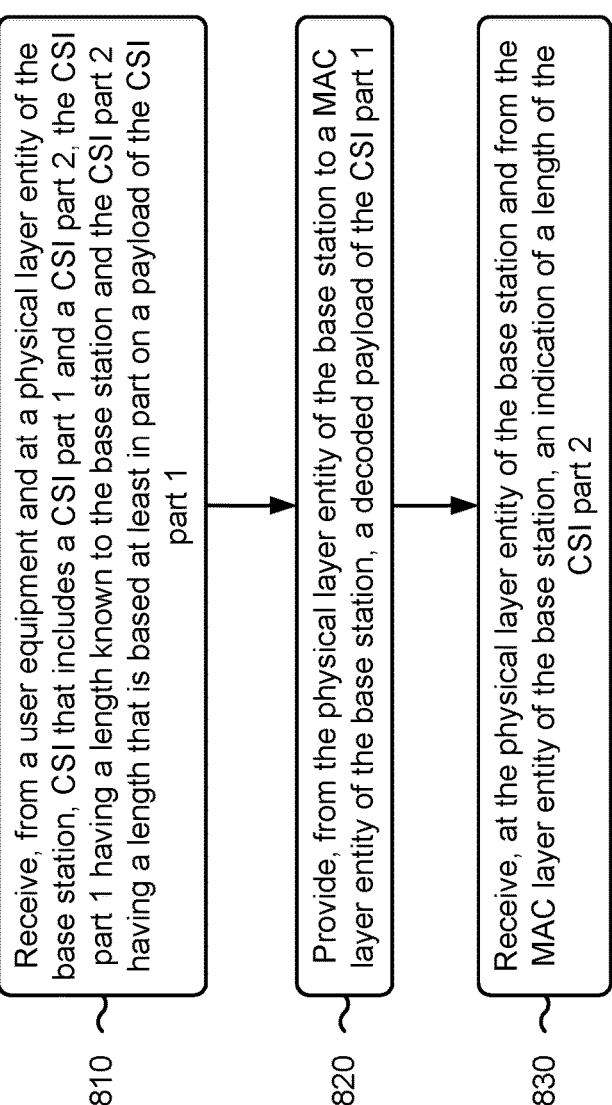

810 Receive, from a user equipment and at a physical layer entity of the base station, CSI that includes a CSI part 1 and a CSI part 2, the CSI part 1 having a length known to the base station and the CSI part 2 having a length that is based at least in part on a payload of the CSI part 1

820 Provide, from the physical layer entity of the base station to a MAC layer entity of the base station, a decoded payload of the CSI part 1

830 Receive, at the physical layer entity of the base station and from the MAC layer entity of the base station, an indication of a length of the CSI part 2

CHANNEL STATE INFORMATION DECODING

CROSS-REFERENCE TO RELATED APPLICATIONS

This Patent Application is a 371 national stage of PCT Application No. PCT/US2022/070498 filed on Feb. 3, 2022, entitled "CHANNEL STATE INFORMATION DECODING," which claims priority to India Provisional Patent Application No. 20/211,1004629, filed on Feb. 3, 2021, entitled "CHANNEL STATE INFORMATION DECODING". The disclosures of the prior Applications are considered part of and are incorporated by reference in their entirety into this Patent Application.

FIELD OF THE DISCLOSURE

Aspects of the present disclosure generally relate to wireless communication and to techniques and apparatuses for channel state information decoding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM))

on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network entity for wireless communication. The first network entity may include a memory and one or more processors coupled to the memory. The one or more processors may be configured to receive, from a user equipment, channel state information (CSI) that includes a CSI part 1 and a CSI part 2, the CSI part 2 having a length that is based at least in part on a payload of the CSI part 1. The one or more processors may be configured to decode a payload of the CSI part 2 based at least in part on a payload of the CSI part 1 and one or more parameters indicated by a second network entity associated with the first network entity, wherein the one or more parameters comprise one or more of one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths.

Some aspects described herein relate to a first network entity for wireless communication. The first network entity may include a memory and one or more processors coupled to the memory. The one or more processors may be configured to transmit, to a second network entity, an indication of one or more parameters for decoding channel state information (CSI) that includes a CSI part 1 and a CSI part 2, the CSI part 2 having a length that is based at least in part on a payload of the CSI part 1, wherein the one or more parameters comprise one or more of one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths. The one or more processors may be configured to receive, from the second network entity, the payload of the CSI part 1 and a payload of the CSI part 2.

Some aspects described herein relate to a method of wireless communication performed by a first network entity. The method may include receiving, from a user equipment, channel state information (CSI) that includes a CSI part 1 and a CSI part 2, the CSI part 2 having a length that is based at least in part on a payload of the CSI part 1. The method may include decoding a payload of the CSI part 2 based at least in part on a payload of the CSI part 1 and one or more parameters indicated by a second network entity associated with the first network entity, wherein the one or more parameters comprise one or more of one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths.

Some aspects described herein relate to a method of wireless communication performed by a first network entity. The method may include transmitting, to a second network entity, an indication of one or more parameters for decoding channel state information (CSI) that includes a CSI part 1 and a CSI part 2, the CSI part 2 having a length that is based at least in part on a payload of the CSI part 1, wherein the one or more parameters comprise one or more of, one or more numbers of nonzero coefficients for precoding matrix indicators associated with CSI reports within the CSI part 1, an indication of priorities of elements of the 2 corresponding to the CSI part 1, or a mapping between at least one non-singular subset of parameter values or sizes and CSI part 2 lengths. The method may include receiving, from the second network entity, the payload of the CSI part 1 and a payload of the CSI part 2.

Some aspects described herein relate to a non-transitory computer-readable medium that stores a set of instructions for wireless communication by a first network entity. The set of instructions, when executed by one or more processors of the first network entity, may cause the first network entity to receive, from a user equipment, channel state information (CSI) that includes a CSI part 1 and a CSI part 2, the CSI part 2 having a length that is based at least in part on a payload of the CSI part 1. The set of instructions, when executed by one or more processors of the first network entity, may cause the first network entity to decode a payload of the CSI part 2 based at least in part on a payload of the CSI part 1 and one or more parameters indicated by a second network entity associated with the first network entity, wherein the one or more parameters comprise one or more of one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths.

Some aspects described herein relate to a non-transitory computer-readable medium that stores a set of instructions for wireless communication by a first network entity. The set of instructions, when executed by one or more processors of the first network entity, may cause the first network entity to transmit, to a second network entity, an indication of one or more parameters for decoding channel state information (CSI) that includes a CSI part 1 and a CSI part 2, the CSI part 2 having a length that is based at least in part on a payload of the CSI part 1, wherein the one or more parameters comprise one or more of one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths. The set of instructions, when executed by one or more processors of the first network entity, may cause the first network entity to receive, from the second network entity, the payload of the CSI part 1 and a payload of the CSI part 2.

Some aspects described herein relate to an apparatus for wireless communication. The apparatus may include means for receiving, from a user equipment, channel state information (CSI) that includes a CSI part 1 and a CSI part 2, the CSI part 2 having a length that is based at least in part on a payload of the CSI part 1. The apparatus may include means for decoding a payload of the CSI part 2 based at least in part on a payload of the CSI part 1 and one or more parameters indicated by a second network entity associated with the first network entity, wherein the one or more parameters comprise one or more of one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths.

Some aspects described herein relate to an apparatus for wireless communication. The apparatus may include means for transmitting, to a second network entity, an indication of one or more parameters for decoding channel state information (CSI) that includes a CSI part 1 and a CSI part 2, the CSI part 2 having a length that is based at least in part on a payload of the CSI part 1, wherein the one or more parameters comprise one or more of, one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths. The apparatus may include means for receiving, from the second network entity, the payload of the CSI part 1 and a payload of the CSI part 2.

In some aspects, a method of wireless communication performed by a base station includes receiving, from a user equipment and at a physical (PHY) layer entity of the base station, channel state information (CSI) that includes a CSI part 1 and a CSI part 2, the CSI part 1 having a length known to the base station and the CSI part 2 having a length that is based at least in part on a payload of the CSI part 1; and decoding, at the PHY layer entity of the base station, a payload of the CSI part 2 based at least in part on a payload of the CSI part 1 and one or more parameters indicated by a medium access control (MAC) layer entity of the base station, wherein the one or more parameters comprise one or more of: one or more numbers of nonzero coefficients for precoding matrix indicators (PMIs) associated with CSI reports within the CSI part 1, an indication of priorities of the CSI reports within the CSI part 1, or a mapping between at least one non-singular subset of parameter values or sizes and CSI part 2 lengths, or a map between at least one non-singular subset of parameter values or sizes and CSI part 2 lengths.

In some aspects, a method of wireless communication performed by a base station includes receiving, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1; providing, from the PHY layer entity of the base station to MAC layer entity of the base station, a decoded payload of the CSI part 1; and receiving, at the PHY layer entity of the base station and from the MAC layer entity of the base station, an indication of a length of the CSI part 2.

In some aspects, a base station for wireless communication includes a memory; and one or more processors coupled to the memory, the one or more processors configured to: receive, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1; and decode, at the PHY layer entity of the base station, a payload of the CSI part 2 based at least in part on a payload of the CSI part 1 and one or more parameters indicated by MAC layer entity of the base station, wherein the one or more parameters comprise one or more of: one or more numbers of nonzero coefficients for precoding matrix indicators associated with CSI reports within the CSI part 1, an indication of priorities of the CSI reports within the CSI part 1, or a mapping between at least one non-singular subset of parameter values or sizes and CSI part 2 lengths, or a map between at least one non-singular subset of parameter values or sizes and CSI part 2 lengths.

In some aspects, a base station for wireless communication includes a memory; and one or more processors coupled to the memory, the one or more processors configured to: receive, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1; provide, from the PHY layer entity of the base station to MAC layer entity of the base station, a decoded payload of the CSI part 1; and receive, at the PHY layer entity of the base station and from the MAC layer entity of the base station, an indication of a length of the CSI part 2.

In some aspects, a non-transitory computer-readable medium storing a set of instructions for wireless communication includes one or more instructions that, when executed by one or more processors of a base station, cause the base station to: receive, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1; and decode, at the PHY layer entity of the base station, a payload of the CSI part 2 based at least in part on a payload of the CSI part 1 and one or more parameters indicated by MAC layer entity of the base station, wherein the one or more parameters comprise one or more of: one or more numbers of nonzero coefficients for precoding matrix indicators associated with CSI reports within the CSI part 1, an indication of priorities of the CSI reports within the CSI part 1, or a mapping between at least one non-singular subset of parameter values or sizes and CSI part 2 lengths, or a map between at least one non-singular subset of parameter values or sizes and CSI part 2 lengths.

In some aspects, a non-transitory computer-readable medium storing a set of instructions for wireless communication includes one or more instructions that, when executed by one or more processors of a base station, cause the base station to: receive, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1; provide, from the PHY layer entity of the base station to MAC layer entity of the base station, a decoded payload of the CSI part 1; and receive, at the PHY layer entity of the base station and from the MAC layer entity of the base station, an indication of a length of the CSI part 2.

In some aspects, an apparatus for wireless communication includes means for receiving, from a user equipment and at a PHY layer entity of the apparatus, CSI that includes a CSI part 1 and a CSI part 2, the CSI part 1 having a length known to the apparatus and the CSI part 2 having a length that is based at least in part on a payload of the CSI part 1; and means for decoding, at the PHY layer entity of the apparatus, a payload of the CSI part 2 based at least in part on a payload of the CSI part 1 and one or more parameters indicated by MAC layer entity of the apparatus, wherein the one or more parameters comprise one or more of: one or more numbers of nonzero coefficients for precoding matrix indicators associated with CSI reports within the CSI part 1, an indication of priorities of the CSI reports within the CSI part 1, or a mapping between at least one non-singular subset of parameter values or sizes and CSI part 2 lengths, or a map between at least one non-singular subset of parameter values or sizes and CSI part 2 lengths.

In some aspects, an apparatus for wireless communication includes means for receiving, from a user equipment and at a PHY layer entity of the apparatus, CSI that includes a CSI part 1 and a CSI part 2, the CSI part 1 having a length known to the apparatus and the CSI part 2 having a length that is based at least in part on a payload of the CSI part 1; means for providing, from a PHY layer entity of the apparatus to MAC layer entity of the apparatus, a decoded payload of the CSI part 1; and means for receiving, at the PHY layer entity of the apparatus and from the MAC layer entity of the apparatus, an indication of a length of the CSI part 2.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7 and 8 are diagrams illustrating example processes associated with channel state information decoding, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
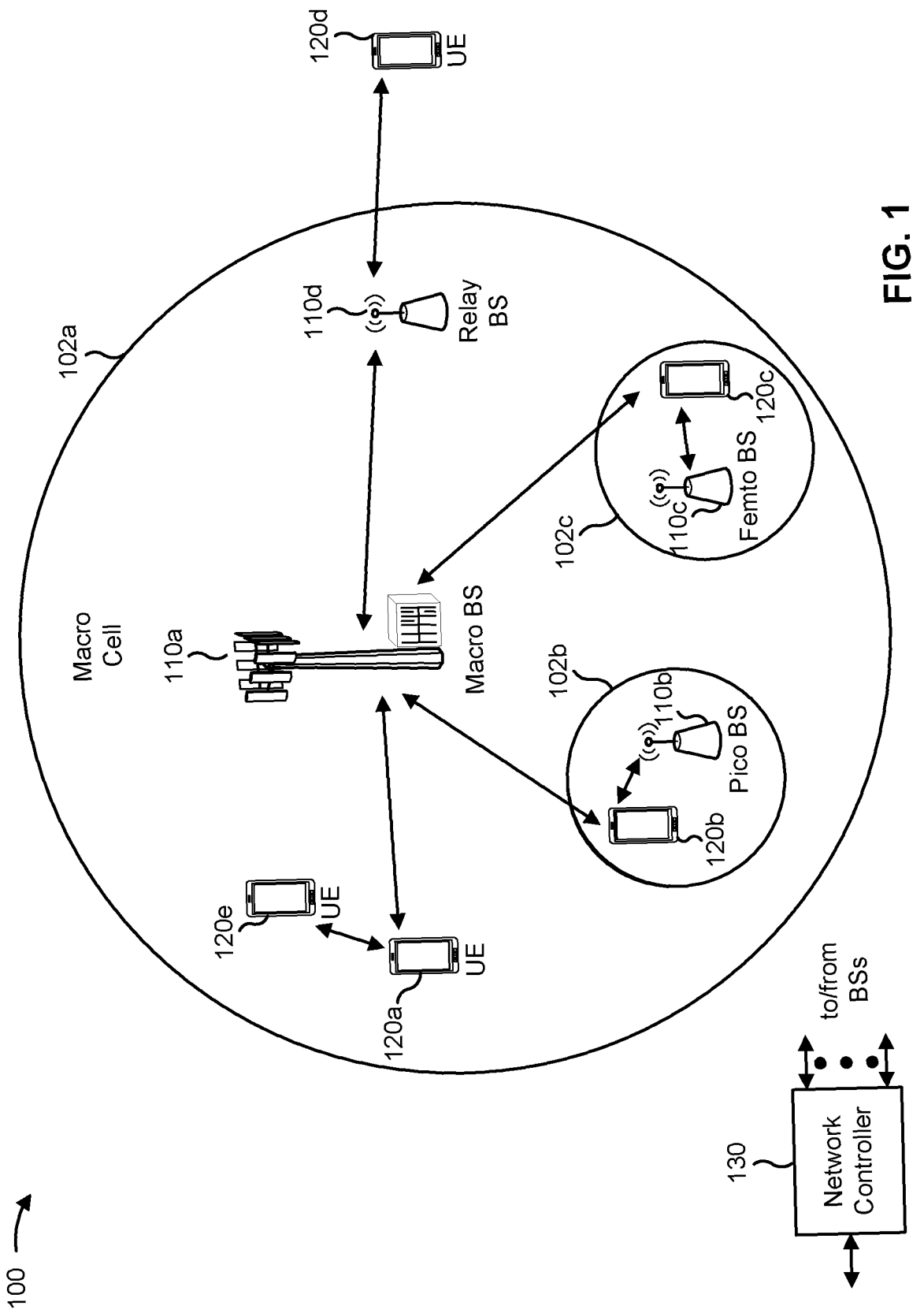
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
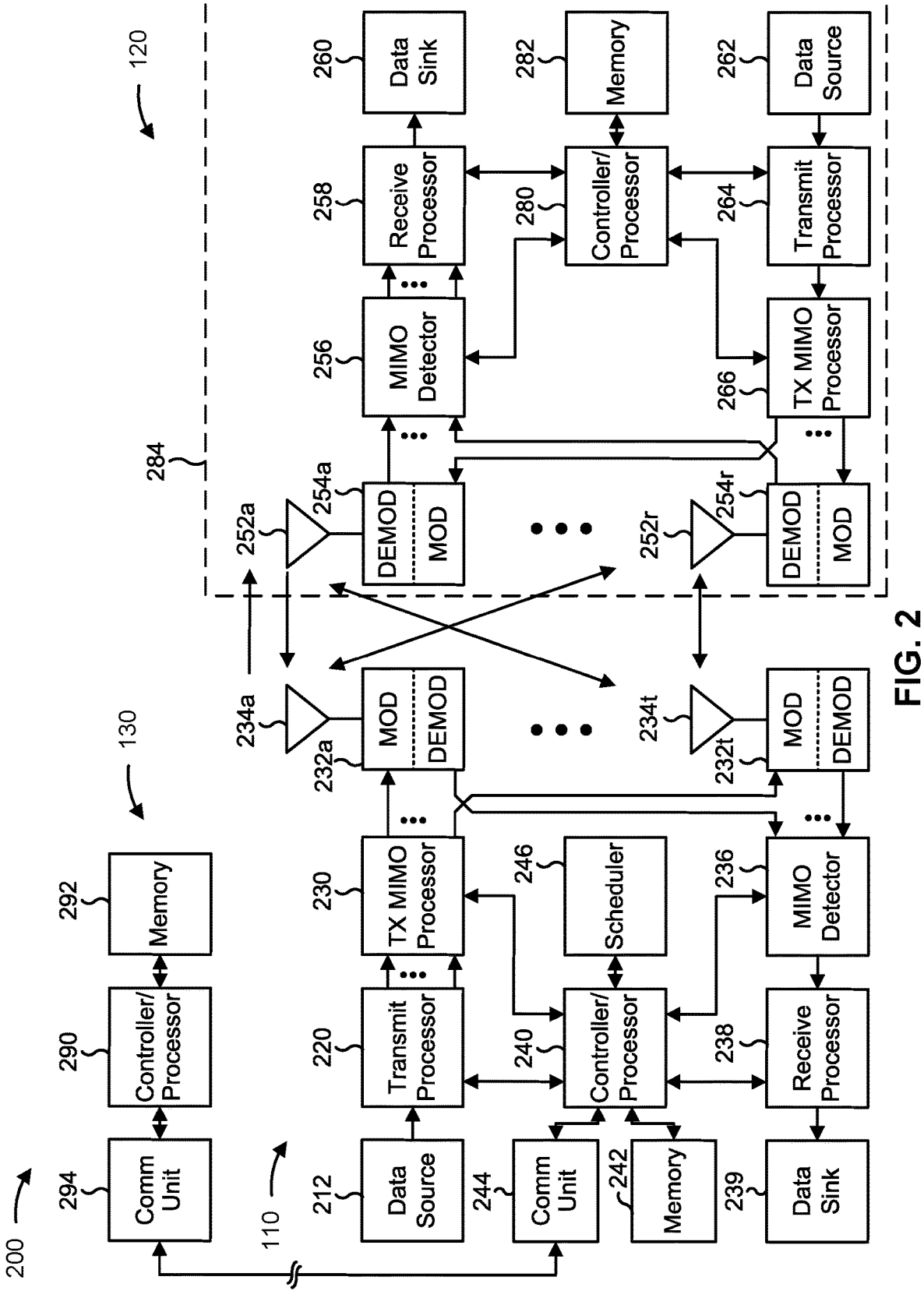
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-10).

Controller/processor 240 of base station 110, controller/ processor 280 of UE 120, and/or any other component(s) of FIG. 2 may perform one or more techniques associated with channel state information decoding, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the base station includes means for receiving, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1; or means for decoding, at the PHY layer entity of the base station, a payload of the CSI part 2 based at least in part on a payload of the CSI part 1 and one or more parameters indicated by MAC layer entity of the base station, wherein the one or more parameters comprise one or more of: one or more numbers of nonzero coefficients for precoding matrix indicators associated with CSI reports within the CSI part 1, an indication of priorities of the CSI reports within the CSI part 1, or a mapping between at least one non-singular subset of parameter values or sizes and CSI part 2 lengths. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for receiving, at the PHY layer entity of the base station and from the MAC layer entity of the base station, an indication of the one or more parameters.

In some aspects, the base station includes means for receiving, at the PHY layer entity of the base station and from the MAC layer entity of the base station, the indication of the one or more parameters at the PHY layer entity of the base station via a functional application platform interface.

In some aspects, the base station includes means for receiving, at the PHY layer entity of the base station and from the MAC layer entity of the base station, the one or more parameters via one or more of: explicit indications of the one or more parameters, implicit indications of the one or more parameters, or a look-up table In some aspects, the base station includes means for decoding the payload of the CSI part 1 before decoding the payload of the CSI part 2.

In some aspects, the base station includes means for providing, from the PHY layer entity of the base station to the MAC layer entity of the base station, the payload of the CSI part 2 after decoding the payload of the CSI part 2.

In some aspects, the base station includes means for receiving, at the PHY layer entity of the base station and from the MAC layer entity of the base station, an indication of one or more parameters to decode the CSI part 1.

In some aspects, the base station includes means for transmitting, to the user equipment, one or more of a control message or a configuration message based at least in part on the payload of the CSI part 1 and the CSI part 2.

In some aspects, the base station includes means for receiving, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1; means for providing, from the PHY layer entity of the base station to MAC layer entity of the base station, a decoded payload of the CSI part 1; or means for receiving, at the PHY layer entity of the base station and from the MAC layer entity of the base station, an indication of a length of the CSI part 2. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for decoding, at the PHY layer entity of the base station, a payload of the CSI part 2 based at least in part on the length of the CSI part 2.

In some aspects, the base station includes means for providing, from the PHY layer entity of the base station to the MAC layer entity of the base station, a decoded payload of the CSI part 2.

In some aspects, the base station includes means for receiving, at the PHY layer entity of the base station and from the MAC layer entity of the base station, an indication of one or more parameters to decode the CSI part 1.

In some aspects, the base station includes means for receiving, at the PHY layer entity of the base station and from the MAC layer entity of the base station, the indication of the length of the CSI part 2 via a functional application platform interface.

In some aspects, the base station includes means for transmitting, to the user equipment, one or more of a control message or a configuration message based at least in part on the payload of the CSI part 1 and the CSI part 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
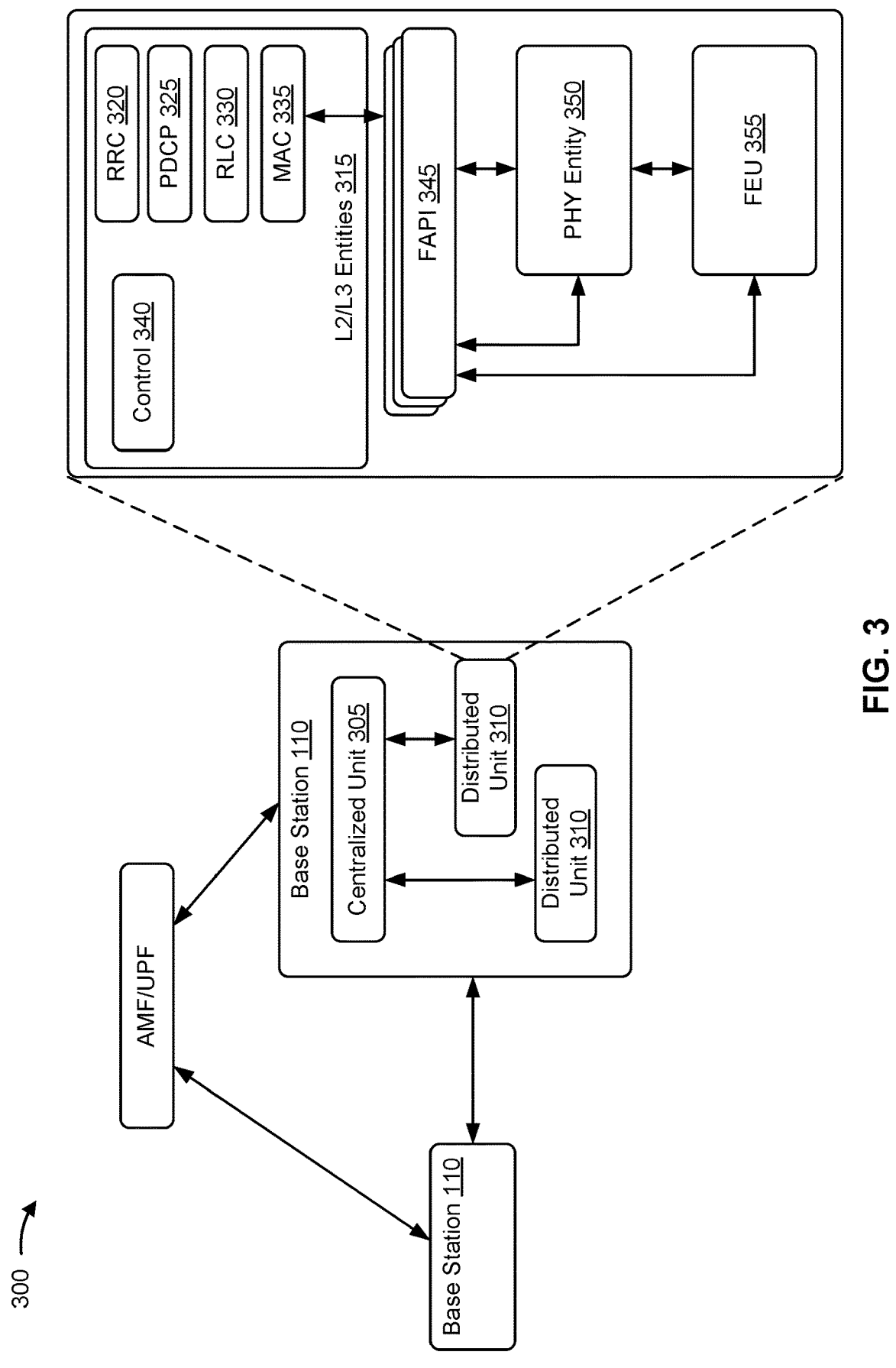
FIG. 3 is a diagram illustrating an example of entities of a base station, in accordance with the present disclosure.

FIG. 3 is a diagram illustrating an example 300 of entities of a base station, in accordance with the present disclosure. As shown in FIG. 3, a base station 110 may communicate with another base station 110 using, for example, an Xn interface. As also shown in FIG. 3, the base station 110 and/or the other base station 110 may communicate with an access and mobility management function (AMF) entity and/or a user plane function (UPF) entity using, for example, an NG interface. The AMF and/or the UPF may include, or may be included in, one or more computing devices, such as a server device, a base station, and/or a mobility management entity.

The base station 110 may include a centralized unit 305 and/or one or more distributed units 310. The centralized unit 305 may manage communications via multiple distributed units 310. The one or more distributed units 310 may be in different geographical locations. The one or more distributed units 310 may include multiple TRPs associated with a single cell or multiple TRPs associated with multiple cells, among other examples. Each of the one or more distributed units 310 may be referred to as a base station that communicates (e.g., control information or data, among other examples) with a common centralized unit 305. The one or more distributed units 310 may communicate with the centralized unit 305 via a fronthaul network and/or a fronthaul interface.

As shown in FIG. 3, the distributed unit 310 may include one or more layer 1 and layer 2 (L2/L3) entities 315. For example, the L2/L3 entities 315 may include a radio resources control layer entity 320, a packet data convergence protocol (PDCP) layer entity 325, a radio link control (RLC) layer entity 330, MAC layer entity 335, and/or a control layer entity 340 (e.g., including a radio resource management (RRM) entity and/or a self-organizing networks (SON) entity), among other examples.

The L2/L3 entities 315 may manage communications with one or more devices, such as UEs, via the base station 110. For example, L2/L3 entities 315 may read different portions of a data packet received from a UE, may direct the data packet based at least in part on the different portions of the data packet, may determine a communication parameter based at least in part on the different portions of the data packet, and/or may generate a communication for the UE based at least in part on the different portions of the data packet, among other examples.

As shown in FIG. 3, the distributed unit 310 may include an interface for communication between the MAC layer entity 335 and a physical (PHY) layer entity 350. For example, the interface may include a functional application platform interface (FAPI) 345. The base station 110 (e.g., the distributed unit 310) may use the FAPI 345 to provide control information and/or data between the MAC layer entity 335 and the PHY layer entity 350. In some base stations 110, the MAC layer entity 335 and the PHY layer entity 350 may communicate via the FAPI 345 in a split-6 configuration. A split-6 configuration may include the distributed unit 310 that is split into a first functional unit that includes the L2/L3 layer entities 315 including the MAC layer entity 335 and a second functional unit that includes the PHY layer entity 350 and a front end unit (FEU) 355.

The FAPI 345 may include a control plane sub-interface for communicating control information between the MAC layer entity 335 and the PHY layer entity 350. The control plane sub-interface may be used to communicate in a stateful communication format. Additionally, or alternatively, the FAPI 345 may include a data sub-interface for communicating data between the MAC layer entity 335 and the PHY layer entity 350. The data sub-interface may be stateless during some or all communications. For example, the MAC layer entity 335 may configure, for each slot, a PHY channel and/or transport blocks for the PHY channel to use to transmit and/or receive data from one or more UEs.

When receiving data from a UE, the FEU 355 may receive one or more radio frequency (RF) signals (e.g., via one or more antenna groups). The FEU 355 may perform one or more operations on the RF signals, such as such as an analog to digital conversion and/or one or more digital front end operations, among other examples. The PHY layer entity 350 may receive one or more encoded data packets from the FEU 355 and may decode the one or more data packets before providing a decoded payload to the MAC layer entity 335 via the FAPI 345. The L2/L3 entities 315 may interpret the decoded payload to control one or more communications with the UE and/or to direct the decoded payload to another device (e.g., a device that includes the AMF and/or the UPF).

When transmitting the data to the UE, the PHY layer entity 350 may receive, via the FAPI 345, a payload for transmission to the UE. The PHY layer entity 350 may encode the payload, may perform beamforming (e.g., digital beamforming), and/or perform one or more baseband operations on the payload in preparation for transmitting. The PHY layer entity 350 may provide the payload, after performing one or more operations on the payload, to the FEU 355 for transmission to the UE. The FEU 355 may perform one or more operations (e.g., using one or more devices), such as a digital to analog conversion, analog beamforming, and/or one or more digital front end operations, among other examples to transmit the payload using a radio frequency (e.g., over the air) transmission.

The FEU 355 and the PHY layer entity 350 may be separate devices or may be included in a single device. Additionally, or alternatively, the L2/L3 entities 315 may be included in one or more devices that are separate from (e.g., located in one or more different geographical locations from) the PHY layer entity 350 and/or the FEU 355.

As indicated above, FIG. 3 is provided as an example. Other examples may differ from what is described with regard to FIG. 3.

Figure 4:
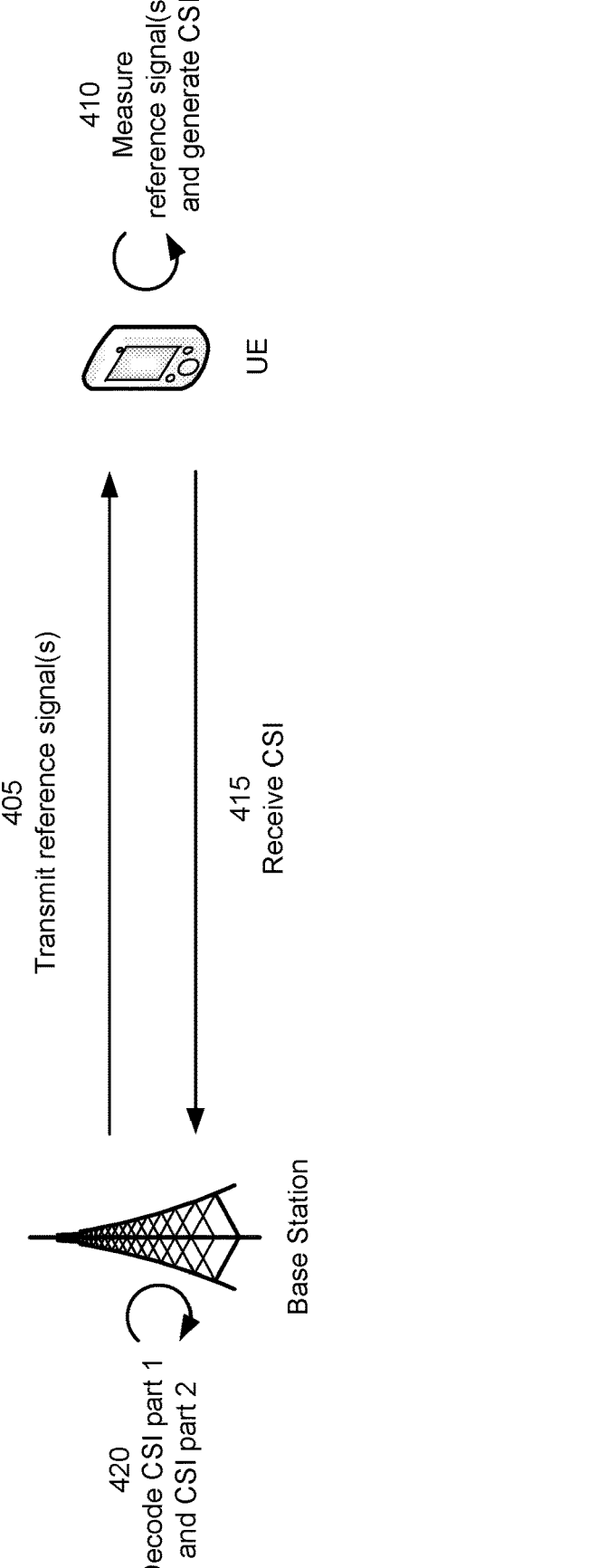
FIG. 4 is a diagram illustrating an example associated with reception of channel state information at a base station, in accordance with the present disclosure.

FIG. 4 is a diagram illustrating an example 400 associated with reception of channel state information at a base station, in accordance with the present disclosure. As shown in FIG. 4, a UE may communicate with a base station. In some aspects, the base station and the UE may be configured to transmit and/or receive reference signals, CSI, control information, configuration information, and/or data, among other examples.

As shown by reference number 405, the base station may transmit, and the UE may receive, one or more reference signals. As shown by reference number 410, the UE may measure the one or more reference signals and/or generate CSI.

As shown by reference number 415, the base station may receive, and the UE may transmit, the CSI. The CSI may include one or more CSI reports associated with one or more beams and/or one or more parameters associated with a beam. The UE may transmit the CSI via a physical uplink control channel (PUCCH) or a physical uplink shared channel (PUSCH). Content length of the CSI may vary based at least in part on information included in the CSI (e.g., a channel rank). The CSI may include a CSI part 1 that has a length that is known to the base station. The base station may know the length of the CSI part 1 based at least in part on the base station configuring (e.g., using radio resource control (RRC) signaling) the length or based at least in part on the UE signaling (e.g., using downlink control information (DCI)) the length, among other examples. The CSI may include a CSI part 2 that has a length that is based at least in part on a payload of the CSI part 1 and/or information that is known to the base station (e.g., based at least in part on the base station configuring the information or based at least in part on the base station signaling the information).

As shown by reference number 420, the base station may decode the CSI part 1 and the CSI part 2 of the CSI. The base station may be unable to decode the CSI part 2 before decoding at least a portion of the CSI part 1 associated with a length of the CSI part 2. For example, resources (e.g., resource elements) used by the UE to signal a CSI part 2 codeword in PUSCH may be a function of the length of the CSI part 2 payload.

The CSI part 1 and the CSI part 2 include reports having various priorities (e.g., all different priorities or different priorities for some reports and same priorities for other reports). Reports included in the CSI part 2 correspond to reports in the CSI part 1. Lengths of reports in the CSI part 2 depends on information (e.g., ranks) indicated in corresponding reports in the CSI part 1. Reports in the CSI part 2 may be ordered based at least in part on priorities of the reports (e.g., in descending priority), until a threshold condition is satisfied. For example, the threshold condition may indicate a maximum number of bits that may be used for the CSI part 2. CSI part 2 reports (e.g., low-priority reports) that extend beyond the threshold conditions may be dropped from the CSI. In some cases, the threshold condition includes: if a CSI Part 2 report of priority p is dropped, all CSI Part 2 reports of priority p or >p (e.g., lower priority than priority p) are dropped. This may be based at least in part on a payload for a coding rate of the PUCCH or number of bits in PUSCH being too large.

As indicated above, FIG. 4 is provided as an example. Other examples may differ from what is described with regard to FIG. 4.

In some networks, a base station may be configured to decode CSI at a PHY layer entity and may be configured to interpret CSI at an L2/L3 entity, such as a MAC layer entity. However, based at least in part on the PHY layer entity being unable to decode a CSI part 2 without information indicated in a payload of a CSI part 1, the PHY layer entity may be unable to decode the CSI part 2. Based at least in part on the PHY layer entity being unable to decode the CSI part 2, the base station may fail to receive the CSI, which may consume power, computing, network, and/or communication resources to correct. Additionally, or alternatively, the base station may not configure the UE with a CSI part 2 that is based at least in part on the CSI part 1. This may consume network resources based at least in part on the base station configuring a fixed length of CSI part 2 that may be unnecessarily long or that is too short and excludes CSI that may be used to improve optimization of communication channels between the base station and the UE.

In some aspects described herein, a base station may provide an indication of one or more parameters from a MAC layer entity to the PHY layer entity. The one or more parameters may be configured for the PHY layer entity to use to decode a CSI part 2 based at least in part on a payload of a CSI part 1. In some aspects, the base station may receive, via the PHY layer entity, CSI that includes a CSI part 1 and a CSI part 2. The base station may decode a payload of the CSI part 1 at the PHY layer entity. The base station may, at the PHY layer entity, determine a length of the CSI part 2 based at least in part on the one or more parameters and the payload of the CSI part 1. Based at least in part on the length of the CSI part 2, the base station may decode the CSI part 2 at the PHY layer entity. The PHY layer entity may provide a decoded payload of the CSI part 2 to the MAC layer entity (e.g., using an FAPI).

In some aspects described herein, a base station may receive, via a PHY layer entity, CSI that includes a CSI part 1 and a CSI part 2. The base station may decode a payload of the CSI part 1 at the PHY layer entity. The PHY layer entity may provide a decoded payload of the CSI part 1 to a MAC layer entity of the base station. The base station may determine a length of the CSI part 2 and may provide an indication of the length of the CSI part 2 to the PHY layer entity. Based at least in part on the length of the CSI part 2, the base station may decode the CSI part 2 at the PHY layer entity. The PHY layer entity may provide a decoded payload of the CSI part 2 to the MAC layer entity (e.g., using an FAPI).

Based in part of the PHY layer entity receiving an indication of the one or more parameters configured for the PHY layer entity to determine the length of the CSI part 2, or based at least in part on the MAC layer entity providing an indication of the length of the CSI part 2 after receiving the decoded payload of the CSI part 1, the PHY layer entity may decode the CSI part 1 and the CSI part 2. Based at least in part on the PHY layer entity being able to decode the CSI part 2, the base station may receive the CSI, which may conserve power, computing, network, and/or communication resources that may otherwise be consumed to detect and/or correct a failure to receive the CSI. Additionally, or alternatively, the base station may be able to configure the UE with a CSI part 2 that is based at least in part on the CSI part 1. This may conserve network resources that may otherwise have been used to configure a fixed length of CSI part 2 that may be unnecessarily long or that is too short and excludes CSI that may be used to improve optimization of communication channels between the base station and the UE.

Figure 5:
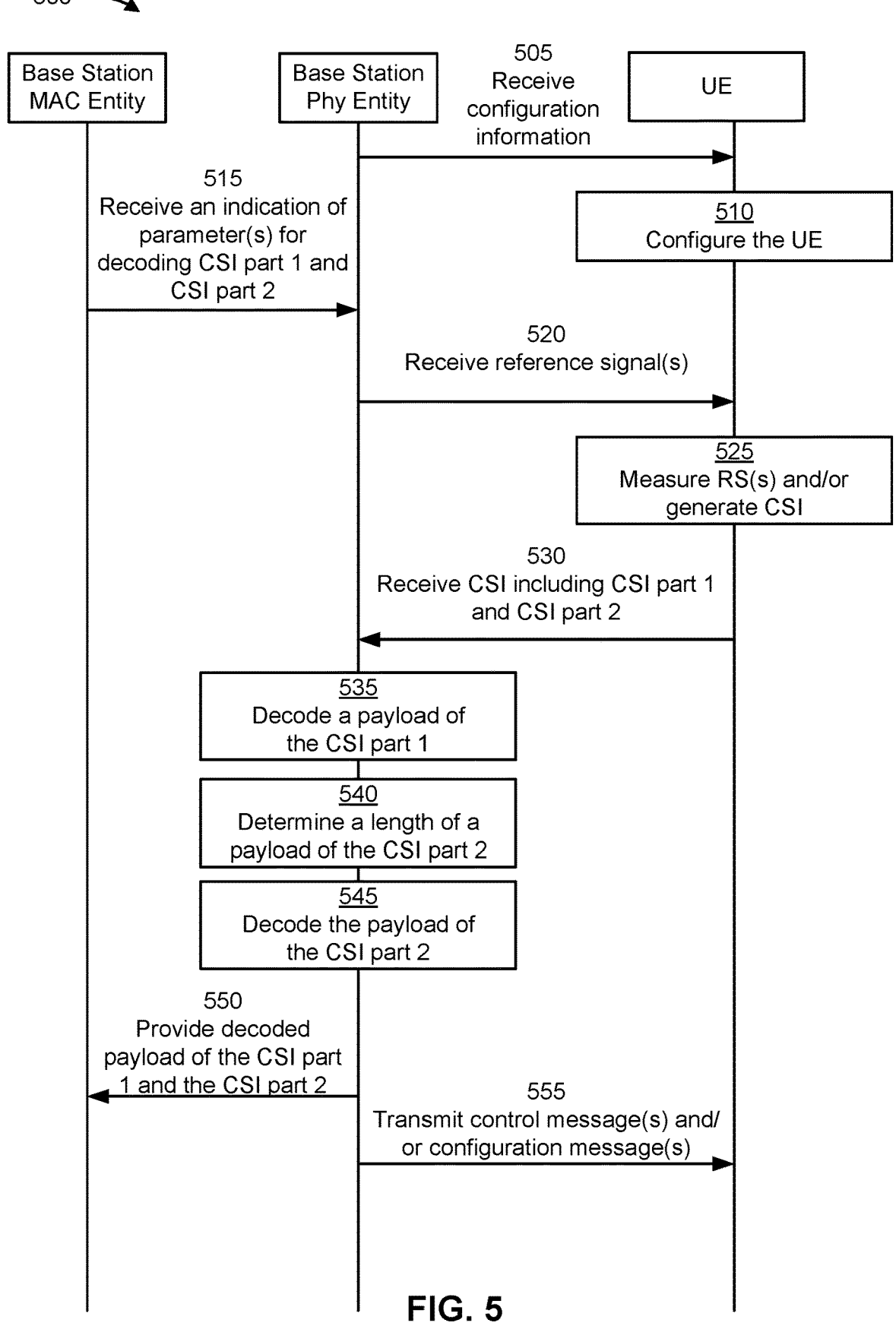
FIGS. 5 and 6 are diagrams illustrating examples associated with channel state information decoding, in accordance with the present disclosure.

FIG. 5 is a diagram illustrating an example 500 associated with channel state information decoding, in accordance with the present disclosure. As shown in FIG. 5, a UE (e.g., UE 120) may communicate with a base station (e.g., base station 110). The UE and the base station may be part of a wireless network (e.g., wireless network 100). The base station may be configured with a split-6 configuration in which a distributed unit of the base station is split into a first functional unit that includes L2/L3 layer entities (e.g., including the MAC layer entity) and a second functional unit (e.g., including a PHY layer entity and an FEU).

As shown by reference number 505, the UE may receive configuration information (e.g., from the base station, another base station, and/or the like) and/or may determine the configuration information based at least in part on a communication protocol. In some aspects, the UE may receive the configuration information via one or more of RRC signaling, medium access control control elements (MAC CEs), DCI, and/or the like. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit CSI in a 2-part CSI configuration. In some aspects, the configuration information may indicate that the UE is to transmit at least one CSI report in a 2-part CSI configuration including a CSI part 1 and a CSI part 2. In some aspects, the configuration information may indicate one or more parameters for the UE to generate the CSI. For example, the configuration information may indicate that the UE is to generate a CSI part 1 and to generate a CSI part 2 based at least in part on information indicated within (e.g., parameters of) the CSI part 2. In some aspects, the configuration information may indicate a length and/or one or more additional parameters for CSI part 1.

As shown by reference number 510, the UE may configure the UE for communicating with the base station. In some aspects, the UE may configure the UE based at least in part on the configuration information. In some aspects, the UE may be configured to perform one or more operations described herein.

As shown by reference number 515, the MAC layer entity of the base station may provide, and the PHY layer entity of the base station may receive, an indication of one or more parameters (e.g., values associated with the one or more parameters) for decoding the CSI part 1 and CSI part 2. In some aspects, the PHY layer entity may receive the indication of the one or more parameters for decoding the CSI part 2 before receiving the CSI or before providing the decoded payload of the CSI part 1, among other examples. Alternatively, the PHY layer entity may receive the indication of the one or more parameters for decoding the CSI part 2 after receiving the CSI or after providing the decoded payload of the CSI part 1, among other examples.

The one or more parameters for decoding the CSI part 1 may include a length of the CSI part 1 and/or a format configured for CSI part 1, among other examples. In some aspects, the PHY layer entity may receive the indication of the one or more parameters for decoding the CSI part 1 after receiving the CSI. In some aspects, the PHY layer entity may receive the indication of the one or more parameters for decoding the CSI part 1 before receiving the CSI.

In some aspects, the PHY layer entity may receive the indication of the one or more parameters for decoding the CSI part 2 before receiving associated CSI or before providing a decoded payload of the CSI part 1, among other examples. In some aspects, the PHY layer entity may receive the indication of the one or more parameters via an FAPI.

In some aspects, the one or more parameter for decoding CSI part 2 may include a number of nonzero coefficients for precoding matrix indicators associated with CSI reports within the CSI part 1, an indication of priorities of the CSI reports within the CSI part 1, and/or a mapping between at least one non-singular subset of parameter values or sizes and CSI part 2 lengths.

In some aspects, the one or more parameters for decoding the CSI part 2 may include locations and/or sizes in CSI part 1 of one or more numbers of nonzero coefficients for PMIs associated with CSI reports within the CSI part 1 or an indication of priorities of the CSI reports within the CSI part 1, or a mapping of at least one non-singular subset of parameter values or sizes and CSI part 2 lengths, among other examples. In some aspects, the one or more parameters may include a threshold condition for determination of a length of the CSI part 2 (e.g., indicating a maximum length of CSI part 2), a mapping of one or more parameters or combination of parameters (such as rank or number of non-zero parameters) indicated in the CSI part 1 to lengths of portions of the CSI part 2 reports associated with the one or more ranks, one or more locations of one or more values within the CSI part 1 for the PHY layer entity of the base station to use to determine lengths of portions of the CSI part 2 associated with the one or more values, and/or lengths of the one or more values within the CSI part 1 for the PHY layer entity of the base station to use to determine lengths of portions of the CSI part 2 associated with the one or more values, among other examples. In some aspects, the one or more parameters may include a mapping of at least one non-singular subset of parameter values or sizes and CSI part 2 lengths.

In some aspects, MAC layer entity may provide (e.g., as parameters) offsets and/or bitwidths of the one or more parameters in the CSI part 1 that may indicate a length of the CSI part 2 and/or lengths of CSI reports in the CSI part 2. In some aspects, MAC layer entity may provide (e.g., as parameters) values of the one or more parameters, such as priorities of the CSI reports, a mapping of the CSI part 1 reports and corresponding lengths in the CSI part 2 (e.g., csiPart2Length mapping).

In some aspects, the MAC layer entity may provide the one or more parameters via one or more explicit indications of the one or more parameters (e.g., with each parameter indicated in a set of bits) or via one or more implicit indications of the one or more parameters (e.g., via a format indicator associated with a set of values of the one or more parameters), among other examples. In some aspects, the MAC layer entity may provide the one or more parameters via a look-up table that indicates values of the one or more parameters that can be searched based at least in part on values of the payload of the CSI part 1.

As shown by reference number 520, the base station may transmit, and the UE may receive, one or more reference signals. In some aspects, the base station may transmit CSI reference signals (CSI-RSs) and/or synchronization signal blocks (SSBs) for measurement by the UE. The base station may transmit the one or more reference signals as part of a beam management operation, among other examples.

As shown by reference number 525, the UE may measure the one or more reference signals and/or may generate CSI. In some aspects, the UE may measure one or more parameters of the reference signals, and/or determine one or more parameters based at least in part on the measurements, associated with CSI. In some aspects, the one or more parameters may include rank indicator (RI), PMI, CQI, RSRP, and/or signal-to-interference-plus-noise ratio (SINR) at a wideband or subband resolution, among other examples.

As shown by reference number 530, the base station may receive, and the UE may transmit, the CSI including a CSI part 1 and a CSI part 2. The base station may receive the CSI at a MAC layer entity of the base station. The CSI part 1 may have a length known to the base station and the CSI part 2 may have a length that is based at least in part on a payload of the CSI part 1. In some aspects, the length of the CSI part 1 may be known to the base station based at least in part on the base station signaling (e.g., using RRC signaling and/or DCI) the length of the CSI part 1 to the UE before transmission of the CSI.

As shown by reference number 535, the PHY layer entity of the base station may decode a payload of the CSI part 1. In some aspects, the PHY layer entity may decode the CSI part 1 based at least in part on the length of the CSI part 1 and/or the one or more parameters indicated by the MAC layer entity.

As shown by reference number 540, the PHY layer entity of the base station may determine a length of a payload of the CSI part 2. In some aspects, the PHY layer entity may determine the length of the payload of the CSI part 2 based at least in part on the one or more parameters indicated by the MAC layer entity and/or a payload of the CSI part 1.

As shown by reference number 545, the PHY layer entity of the base station may decode a payload of the CSI part 2. In some aspects, the PHY layer entity may decode the CSI part 2 based at least in part on the length of the CSI part 2 and/or the one or more parameters indicated by the MAC layer entity.

As shown by reference number 550, the PHY layer entity of the base station may provide, and the MAC layer entity of the base station may receive, a decoded payload of the CSI part 1 and the CSI part 2. In other words, the PHY layer entity may provide the payload of the CSI part 1 and the payload of the CSI part 2 after decoding the payload of the CSI part 2.

As shown by reference number 555, the base station may transmit one or more control messages and/or one or more configuration messages to the UE. In some aspects, the base station may transmit the one or more control messages and/or the one or more configuration messages to the UE based at least in part on the payload of the CSI part 1 and the CSI part 2. In some aspects, the UE may transmit a control message (e.g., DCI) that indicates that the UE is to use one or more beams for communication with the base station. In some aspects, the UE may transmit a configuration message to indicate one or more beams to be configured for the UE for selection via DCI.

Based in part of the PHY layer entity receiving an indication of the one or more parameters configured for the PHY layer entity to determine the length of the CSI part 2, the PHY layer entity may decode the CSI part 1 and the CSI part 2. Based at least in part on the PHY layer entity being able to decode the CSI part 2, the base station may receive the CSI, which may conserve power, computing, network, and/or communication resources that may otherwise be consumed to detect and/or correct a failure to receive the CSI. Additionally, or alternatively, the base station may be able to configure the UE with a CSI part 2 that is based at least in part on the CSI part 1. This may conserve network resources that may otherwise have been used to configure a fixed length of CSI part 2 that may be unnecessarily long or that is too short and excludes CSI that may be used to improve optimization of communication channels between the base station and the UE.

As indicated above, FIG. 5 is provided as an example. Other examples may differ from what is described with regard to FIG. 5.

Figure 6:
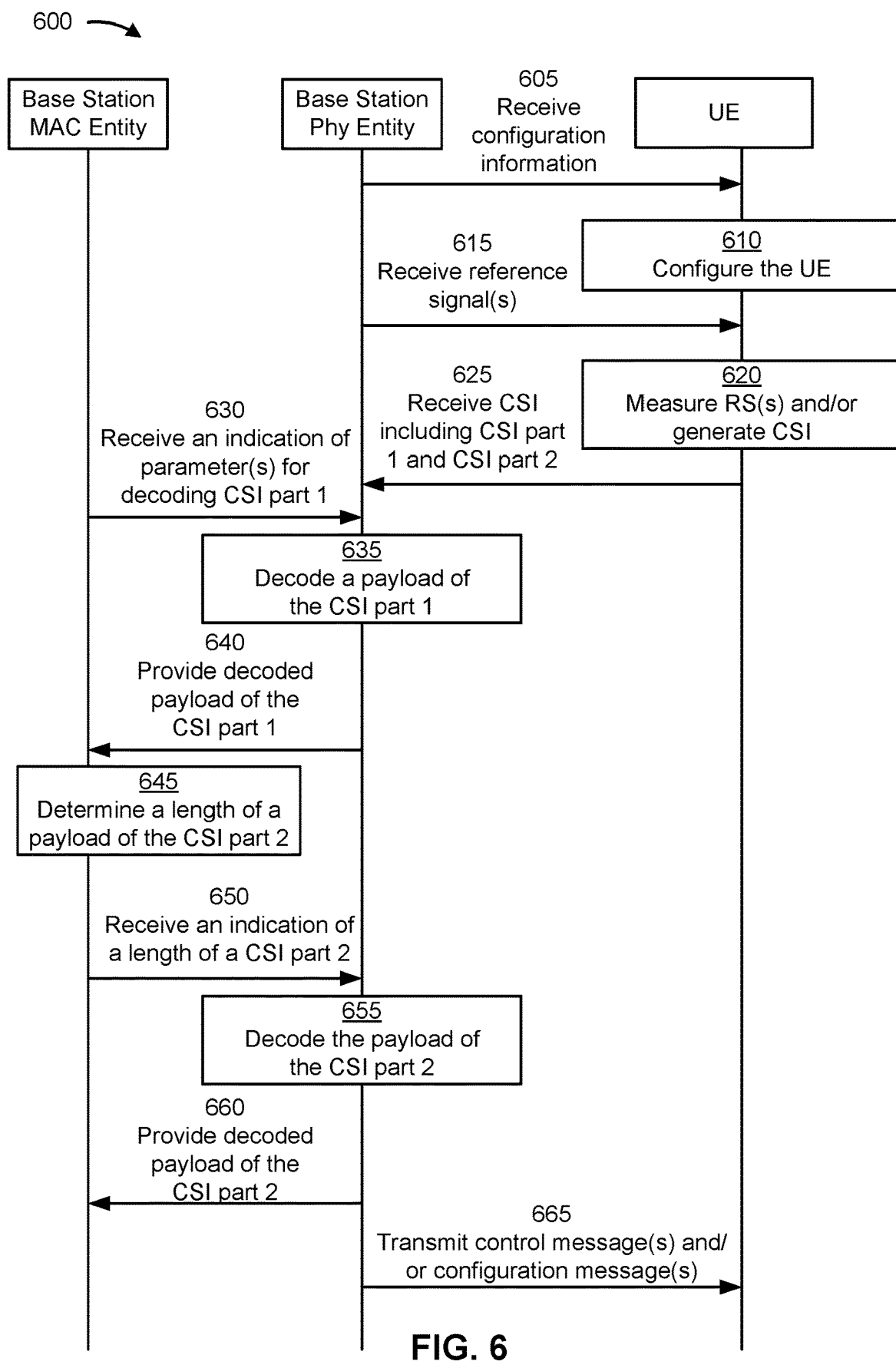

FIG. 6 is a diagram illustrating an example 600 associated with channel state information decoding, in accordance with the present disclosure. As shown in FIG. 6, a UE (e.g., UE 120) may communicate with a base station (e.g., base station 110). The UE and the base station may be part of a wireless network (e.g., wireless network 100). The base station may be configured with a split-6 configuration in which a distributed unit of the base station is split into a first functional unit that includes L2/L3 layer entities (e.g., including the MAC layer entity) and a second functional unit (e.g., including a PHY layer entity and an FEU).

As shown by reference number 605, the UE may receive configuration information (e.g., from the base station, another base station, and/or the like) and/or may determine the configuration information based at least in part on a communication protocol. In some aspects, the UE may receive the configuration information via one or more of RRC signaling, MAC CEs, and/or the like. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit CSI in a 2-part CSI configuration. In some aspects, the configuration information may indicate that the UE is to transmit CSI in a 2-part CSI configuration including a CSI part 1 and a CSI part 2. In some aspects, the configuration information may indicate one or more parameters for the UE to generate the CSI. For example, the configuration information may indicate that the UE is to generate a CSI part 1 and to generate a CSI part 2 based at least in part on information indicated within (e.g., parameters of) the CSI part 2. In some aspects, the configuration information may indicate a length and/or one or more additional parameters for CSI part 1.

As shown by reference number 610, the UE may configure the UE for communicating with the base station. In some aspects, the UE may configure the UE based at least in part on the configuration information. In some aspects, the UE may be configured to perform one or more operations described herein.

As shown by reference number 615, the base station may transmit, and the UE may receive, one or more reference signals. In some aspects, the base station may transmit CSI-RSs and/or SSBs for measurement by the UE. The base station may transmit the one or more reference signals as part of a beam management operation, among other examples.

As shown by reference number 620, the UE may measure the one or more reference signals and/or may generate CSI. In some aspects, the UE may measure one or more parameters of the reference signals, and/or determine one or more parameters based at least in part on the measurements, associated with CSI. In some aspects, the one or more parameters may include RI, PMI, CQI, RSRP, and/or SINR at a wideband or subband resolution, among other examples.

As shown by reference number 625, the base station may receive, and the UE may transmit, the CSI including a CSI part 1 and a CSI part 2. The base station may receive the CSI at a MAC layer entity of the base station. The CSI part 1 may have a length known to the base station, and the CSI part 2 may have a length that is based at least in part on a payload of the CSI part 1. In some aspects, the length of the CSI part 1 may be known to the base station based at least in part on the base station signaling (e.g., using RRC signaling and/or DCI) the length of the CSI part 1 to the UE before transmission of the CSI.

As shown by reference number 630, the MAC layer entity of the base station may provide, and the PHY layer entity of the base station may receive, an indication of one or more parameters for decoding the CSI part 1. For example, the one or more parameters for decoding the CSI part 1 may include a length of the CSI part 1 and/or a format configured for CSI part 1, among other examples. In some aspects, the PHY layer entity may receive the indication of the one or more parameters for decoding the CSI part 1 after receiving the CSI. In some aspects, the PHY layer entity may receive the indication of the one or more parameters for decoding the CSI part 1 before receiving the CSI.

As shown by reference number 635, the PHY layer entity of the base station may decode a payload of the CSI part 1. In some aspects, the PHY layer entity may decode the CSI part 1 based at least in part on the length of the CSI part 1 and/or the one or more parameters indicated by the MAC layer entity.

As shown by reference number 640, the PHY layer entity of the base station may provide, and the MAC layer entity of the base station may receive, a decoded payload of the CSI part 1. In other words, the PHY layer entity may provide the payload of the CSI part 1 after decoding the payload of the CSI part 1.

As shown by reference number 645, the MAC layer entity of the base station may determine a length of the CSI part 2. In some aspects, the MAC layer entity may determine the length of the CSI part 2 based at least in part on the decoded payload of the CSI part 1 and/or one or more additional parameters configured for the UE to use to format the CSI part 2.

As shown by reference number 650, the MAC layer entity of the base station may provide, and the PHY layer entity of the base station may receive, an indication of a length of a payload of the CSI part 2. In some aspects, the PHY layer entity may receive the indication of the length of the payload of the CSI part 2 via an FAPI.

As shown by reference number 655, the PHY layer entity of the base station may decode a payload of the CSI part 2. In some aspects, the PHY layer entity may decode the CSI part 2 based at least in part on the length of the CSI part 2 and/or the one or more parameters indicated by the MAC layer entity.

As shown by reference number 660, the PHY layer entity of the base station may provide, and the MAC layer entity of the base station may receive, a decoded payload of the CSI part 2. In other words, the PHY layer entity may provide the payload of the CSI part 2 after decoding the payload of the CSI part 2.

As shown by reference number 665, the base station may transmit one or more control messages and/or one or more configuration messages to the UE. In some aspects, the base station may transmit the one or more control messages and/or the one or more configuration messages to the UE based at least in part on the payload of the CSI part 1 and the CSI part 2. In some aspects, the UE may transmit a control message (e.g., DCI) that indicates that the UE is to use one or more beams for communication with the base station. In some aspects, the UE may transmit a configuration message to indicate one or more beams to be configured for the UE for selection via DCI.

Based at least in part on the MAC layer entity providing an indication of the length of the CSI part 2 after receiving the decoded payload of the CSI part 1, the PHY layer entity may decode the CSI part 1 and the CSI part 2. Based at least in part on the PHY layer entity being able to decode the CSI part 2, the base station may receive the CSI, which may conserve power, computing, network, and/or communication resources that may otherwise be consumed to detect and/or correct a failure to receive the CSI. Additionally, or alternatively, the base station may be able to configure the UE with a CSI part 2 that is based at least in part on the CSI part 1. This may conserve network resources that may otherwise have been used to configure a fixed length of CSI part 2 that may be unnecessarily long or that is too short and excludes CSI that may be used to improve optimization of communication channels between the base station and the UE.

As indicated above, FIG. 6 is provided as an example. Other examples may differ from what is described with regard to FIG. 6.

FIG. 7 is a diagram illustrating an example process 700 performed, for example, by a base station, in accordance with various aspects of the present disclosure. Example process 700 is an example where the base station (e.g., base station 110) performs operations associated with channel state information decoding.

As shown in FIG. 7, in some aspects, process 700 may include receiving, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1 (block 710). For example, the base station (e.g., using reception component 902, depicted in FIG. 9) may receive, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1, as described above.

As further shown in FIG. 7, in some aspects, process 700 may include decoding, at the PHY layer entity of the base station, a payload of the CSI part 2 based at least in part on a payload of the CSI part 1 and one or more parameters indicated by MAC layer entity of the base station, wherein the one or more parameters comprise one or more of: one or more numbers of nonzero coefficients for precoding matrix indicators associated with CSI reports within the CSI part 1, an indication of priorities of the CSI reports within the CSI part 1, or a mapping between at least one non-singular subset of parameter values or sizes and CSI part 2 lengths (block 720). For example, the base station (e.g., using communication manager component 908, depicted in FIG. 9) may decode, at the PHY layer entity of the base station, a payload of the CSI part 2 based at least in part on a payload of the CSI part 1 and one or more parameters indicated by MAC layer entity of the base station, wherein the one or more parameters comprise one or more of: one or more numbers of nonzero coefficients for precoding matrix indicators associated with CSI reports within the CSI part 1, an indication of priorities of the CSI reports within the CSI part 1, or a mapping between at least one non-singular subset of parameter values or sizes and CSI part 2 lengths, as described above.

Process 700 may include additional aspects, such as any single aspect or any combination of aspects described below and/or in connection with one or more other processes described elsewhere herein.

In a first aspect, process 700 includes receiving, at the PHY layer entity of the base station and from the MAC layer entity of the base station, an indication of the one or more parameters.

In a second aspect, alone or in combination with the first aspect, receiving, at the PHY layer entity of the base station and from the MAC layer entity of the base station, the indication of the one or more parameters comprises receiving, at the PHY layer entity of the base station and from the MAC layer entity of the base station, the indication of the one or more parameters at the PHY layer entity of the base station via a functional application platform interface.

In a third aspect, alone or in combination with one or more of the first and second aspects, the one or more parameters comprise one or more of a threshold condition for determination of a length of the CSI part 2, a mapping of one or more ranks indicated in the CSI part 1 to lengths of portions of the CSI part 2 associated with the one or more ranks, one or more locations of one or more values within the CSI part 1 for the PHY layer entity of the base station to use to determine lengths of portions of the CSI part 2 associated with the one or more values, or lengths of the one or more values within the CSI part 1 for the PHY layer entity of the base station to use to determine lengths of portions of the CSI part 2 associated with the one or more values.

In a fourth aspect, alone or in combination with one or more of the first through third aspects, process 700 includes receiving, at the PHY layer entity of the base station and from the MAC layer entity of the base station, the one or more parameters via one or more of explicit indications of the one or more parameters, implicit indications of the one or more parameters, or a look-up table.

In a fifth aspect, alone or in combination with one or more of the first through fourth aspects, process 700 includes decoding the payload of the CSI part 1 before decoding the payload of the CSI part 2.

In a sixth aspect, alone or in combination with one or more of the first through fifth aspects, process 700 includes providing, from the PHY layer entity of the base station to the MAC layer entity of the base station, the payload of the CSI part 2 after decoding the payload of the CSI part 2.

In a seventh aspect, alone or in combination with one or more of the first through sixth aspects, process 700 includes receiving, at the PHY layer entity of the base station and from the MAC layer entity of the base station, an indication of one or more parameters to decode the CSI part 1.

In an eighth aspect, alone or in combination with one or more of the first through seventh aspects, process 700 includes transmitting, to the user equipment, one or more of a control message or a configuration message based at least in part on the payload of the CSI part 1 and the CSI part 2.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with various aspects of the present disclosure. Example process 800 is an example where the base station (e.g., base station 110) performs operations associated with channel state information decoding.

As shown in FIG. 8, in some aspects, process 800 may include receiving, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1 (block 810). For example, the base station (e.g., using reception component 1002, depicted in FIG. 10) may receive, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1, as described above.

As further shown in FIG. 8, in some aspects, process 800 may include providing, from the PHY layer entity of the base station to MAC layer entity of the base station, a decoded payload of the CSI part 1 (block 820). For example, the base station (e.g., using communication manager 1008, depicted in FIG. 10) may provide, from the PHY layer entity of the base station to MAC layer entity of the base station, a decoded payload of the CSI part 1, as described above.

As further shown in FIG. 8, in some aspects, process 800 may include receiving, at the PHY layer entity of the base station and from the MAC layer entity of the base station, an indication of a length of the CSI part 2 (block 830). For example, the base station (e.g., using reception component 1002, depicted in FIG. 10) may receive, at the PHY layer entity of the base station and from the MAC layer entity of the base station, an indication of a length of the CSI part 2, as described above.

Process 800 may include additional aspects, such as any single aspect or any combination of aspects described below and/or in connection with one or more other processes described elsewhere herein.

In a first aspect, process 800 includes decoding, at the PHY layer entity of the base station, a payload of the CSI part 2 based at least in part on the length of the CSI part 2.

In a second aspect, alone or in combination with the first aspect, process 800 includes providing, from the PHY layer entity of the base station to the MAC layer entity of the base station, a decoded payload of the CSI part 2.

In a third aspect, alone or in combination with one or more of the first and second aspects, process 800 includes receiving, at the PHY layer entity of the base station and from the MAC layer entity of the base station, an indication of one or more parameters to decode the CSI part 1.

In a fourth aspect, alone or in combination with one or more of the first through third aspects, receiving, at the PHY layer entity of the base station and from the MAC layer entity of the base station, the indication of the length of the CSI part 2 comprises receiving, at the PHY layer entity of the base station and from the MAC layer entity of the base station, the indication of the length of the CSI part 2 via a functional application platform interface.

In a fifth aspect, alone or in combination with one or more of the first through fourth aspects, process 800 includes transmitting, to the user equipment, one or more of a control message or a configuration message based at least in part on the payload of the CSI part 1 and the CSI part 2.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
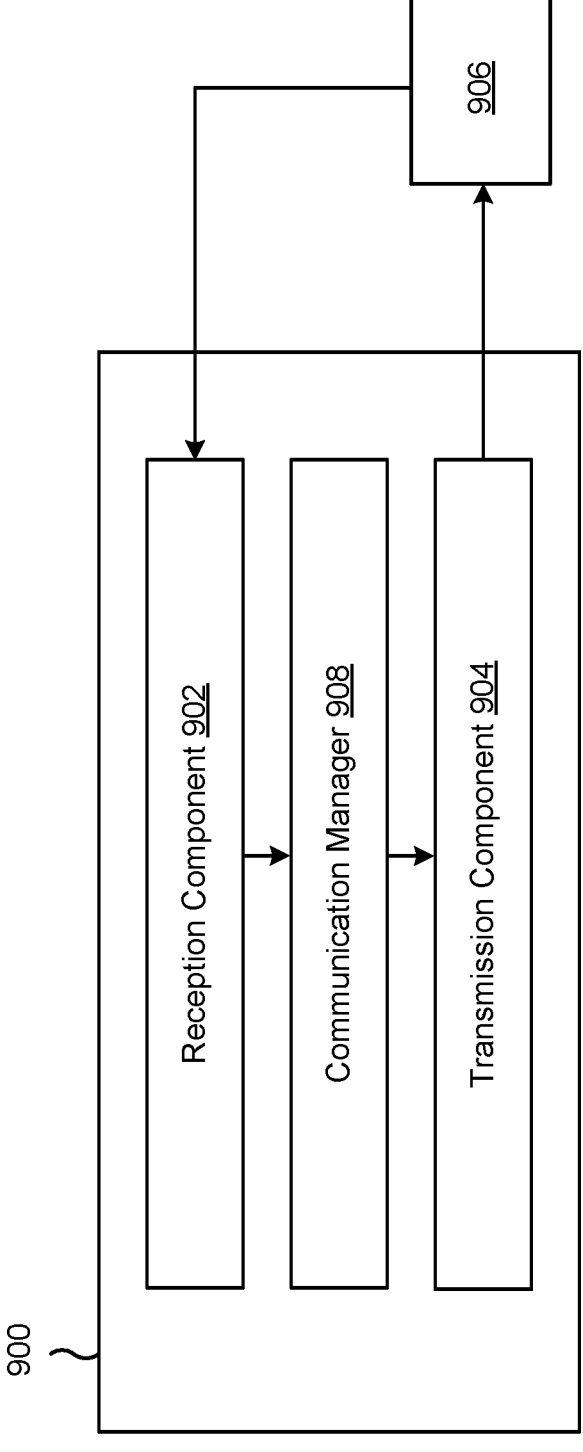
FIGS. 9 and 10 are block diagrams of example apparatuses for wireless communication, in accordance with the present disclosure.

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a communication manager component 908.

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7.

In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may receive, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1. The communication manager component 908 may decode, at the PHY layer entity of the base station, a payload of the CSI part 2 based at least in part on a payload of the CSI part 1 and one or more parameters indicated by MAC layer entity of the base station, wherein the one or more parameters comprise one or more of one or more numbers of nonzero coefficients for precoding matrix indicators associated with CSI reports within the CSI part 1, an indication of priorities of the CSI reports within the CSI part 1, or a mapping between at least one non-singular subset of parameter values or sizes and CSI part 2 lengths.

The reception component 902 may receive, at the PHY layer entity of the base station and from the MAC layer entity of the base station, an indication of the one or more parameters.

The reception component 902 may receive, at the PHY layer entity of the base station and from the MAC layer entity of the base station, the one or more parameters via one or more of explicit indications of the one or more parameters, implicit indications of the one or more parameters, or a look-up table.

The communication manager component 908 may decode the payload of the CSI part 1 before decoding the payload of the CSI part 2.

The communication manager component 908 may provide, from the PHY layer entity of the base station to the MAC layer entity of the base station, the payload of the CSI part 2 after decoding the payload of the CSI part 2.

The reception component 902 may receive, at the PHY layer entity of the base station and from the MAC layer entity of the base station, an indication of one or more parameters to decode the CSI part 1.

The transmission component 904 may transmit, to the user equipment, one or more of a control message or a configuration message based at least in part on the payload of the CSI part 1 and the CSI part 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
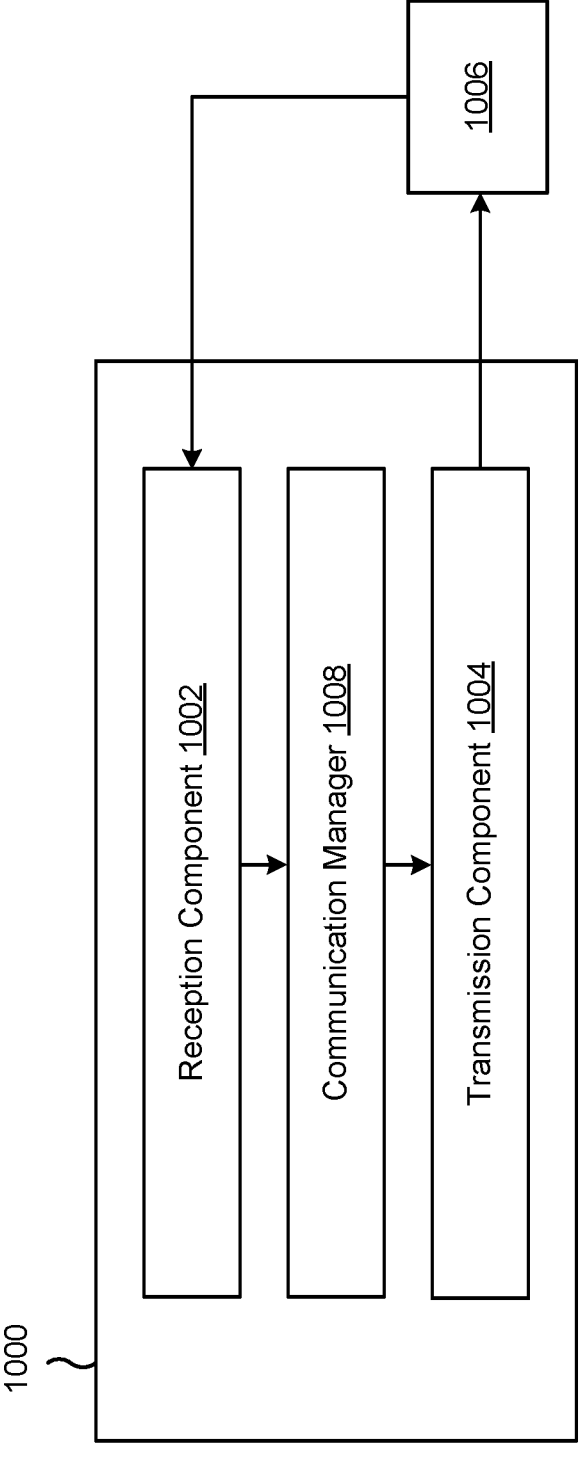

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIGS. 5 and 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The reception component 1002 may receive, from a user equipment and at a PHY layer entity of the base station, CSI that includes a CSI part 1 and a CSI part 2, the CSI part 1 having a length known to the base station and the CSI part 2 having a length that is based at least in part on a payload of the CSI part 1. The communication manager 1008 may provide, from the PHY layer entity of the base station to MAC layer entity of the base station, a decoded payload of the CSI part 1. The reception component 1002 may receive, at the PHY layer entity of the base station and from the MAC layer entity of the base station, an indication of a length of the CSI part 2.

The communication manager 1008 may decode, at the PHY layer entity of the base station, a payload of the CSI part 2 based at least in part on the length of the CSI part 2.

The communication manager 1008 may provide, from the PHY layer entity of the base station to the MAC layer entity of the base station, a decoded payload of the CSI part 2.

The reception component 1002 may receive, at the PHY layer entity of the base station and from the MAC layer entity of the base station, an indication of one or more parameters to decode the CSI part 1.

The transmission component 1004 may transmit, to the user equipment, one or more of a control message or a configuration message based at least in part on the payload of the CSI part 1 and the CSI part 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a base station, comprising: receiving, from a user equipment and at a physical layer entity of the base station, channel state information (CSI) that includes a CSI part 1 and a CSI part 2, the CSI part 1 having a length known to the base station and the CSI part 2 having a length that is based at least in part on a payload of the CSI part 1; and decoding, at the physical layer entity of the base station, a payload of the CSI part 2 based at least in part on a payload of the CSI part 1 and one or more parameters indicated by a medium access control (MAC) layer entity of the base station, wherein the one or more parameters comprise one or more of: one or more numbers of nonzero coefficients for precoding matrix indicators associated with CSI reports within the CSI part 1, an indication of priorities of the CSI reports within the CSI part 1, or a mapping between at least one non-singular subset of parameter values or sizes and CSI part 2 lengths.

Aspect 2: The method of Aspect 1, further comprising: receiving, at the physical layer entity of the base station and from the MAC layer entity of the base station, an indication of the one or more parameters.

Aspect 3: The method of Aspect 2, wherein receiving, at the physical layer entity of the base station and from the MAC layer entity of the base station, the indication of the one or more parameters comprises: receiving, at the physical layer entity of the base station and from the MAC layer entity of the base station, the indication of the one or more parameters at the physical layer entity of the base station via a functional application platform interface.

Aspect 4: The method of any of Aspects 1 through 3, wherein the one or more parameters comprise one or more of: a threshold condition for determination of a length of the CSI part 2; a mapping of one or more ranks indicated in the CSI part 1 to lengths of portions of the CSI part 2 associated with the one or more ranks; one or more locations of one or more values within the CSI part 1 for the physical layer entity of the base station to use to determine lengths of portions of the CSI part 2 associated with the one or more values; or lengths of the one or more values within the CSI part 1 for the physical layer entity of the base station to use to determine lengths of portions of the CSI part 2 associated with the one or more values.

Aspect 5: The method of Aspect 4, further comprising receiving, at the physical layer entity of the base station and from the MAC layer entity of the base station, the one or more parameters via one or more of: explicit indications of the one or more parameters, implicit indications of the one or more parameters, or a look-up table.

Aspect 6: The method of any of Aspects 1 through 5, further comprising: decoding the payload of the CSI part 1 before decoding the payload of the CSI part 2.

Aspect 7: The method of any of Aspects 1 through 6, further comprising: providing, from the physical layer entity of the base station to the MAC layer entity of the base station, the payload of the CSI part 2 after decoding the payload of the CSI part 2.

Aspect 8: The method of any of Aspects 1 through 7, further comprising: receiving, at the physical layer entity of the base station and from the MAC layer entity of the base station, an indication of one or more parameters to decode the CSI part 1.

Aspect 9: The method of any of Aspects 1 through 8, further comprising: transmitting, to the user equipment, one or more of a control message or a configuration message based at least in part on the payload of the CSI part 1 and the CSI part 2.

Aspect 10: A method of wireless communication performed by a base station, comprising: receiving, from a user equipment and at a physical layer entity of the base station, channel state information (CSI) that includes a CSI part 1 and a CSI part 2, the CSI part 1 having a length known to the base station and the CSI part 2 having a length that is based at least in part on a payload of the CSI part 1; providing, from the physical layer entity of the base station to a medium access control (MAC) layer entity of the base station, a decoded payload of the CSI part 1; and receiving, at the physical layer entity of the base station and from the MAC layer entity of the base station, an indication of a length of the CSI part 2.

Aspect 11: The method of Aspect 10, further comprising: decoding, at the physical layer entity of the base station, a payload of the CSI part 2 based at least in part on the length of the CSI part 2.

Aspect 12: The method of Aspect 11, further comprising: providing, from the physical layer entity of the base station to the MAC layer entity of the base station, a decoded payload of the CSI part 2.

Aspect 13: The method of any of Aspects 10 through 12, further comprising: receiving, at the physical layer entity of the base station and from the MAC layer entity of the base station, an indication of one or more parameters to decode the CSI part 1.

Aspect 14: The method of any of Aspects 10 through 12, wherein receiving, at the physical layer entity of the base station and from the MAC layer entity of the base station, the indication of the length of the CSI part 2 comprises: receiving, at the physical layer entity of the base station and from the MAC layer entity of the base station, the indication of the length of the CSI part 2 via a functional application platform interface.

Aspect 15: The method of any of Aspects 10 through 12, further comprising: transmitting, to the user equipment, one or more of a control message or a configuration message based at least in part on the payload of the CSI part 1 and the CSI part 2.

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first network entity for wireless communication, comprising:

a memory; and one or more processors coupled to the memory, wherein the first network entity is configured to:

receive, from a user equipment, channel state information (CSI) that includes a CSI part 1 and a CSI part 2, the CSI part 2 having a length that is based at least in part on a payload of the CSI part 1;

decode a payload of the CSI part 2 based at least in part on a payload of the CSI part 1 and one or more parameters indicated by a second network entity associated with the first network entity, wherein the one or more parameters comprise one or more of:

one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths; and provide, to the second network entity, the payload of the CSI part 2 after decoding the payload of the CSI part 2.

2. The first network entity of claim 1, wherein the first network entity is further configured to:

receive, from the second network entity, an indication of the one or more parameters.

3. The first network entity of claim 2, wherein, to receive the indication of the one or more parameters, the first network entity is configured to:

receive, from the second network entity, the indication of the one or more parameters at the first network entity via a functional application platform interface.

4. The first network entity of claim 1, wherein the one or more parameters comprise one or more of:

a threshold condition for determination of a length of the CSI part 2;

a mapping of one or more ranks indicated in the CSI part 1 to lengths of portions of the CSI part 2 associated with the one or more ranks;

one or more locations of one or more values within the CSI part 1 for the first network entity to use to determine lengths of portions of the CSI part 2 associated with the one or more values; or lengths of the one or more values within the CSI part 1 for the first network entity to use to determine lengths of portions of the CSI part 2 associated with the one or more values.

5. The first network entity of claim 4, wherein the first network entity is further configured to receive the one or more parameters via one or more of:

explicit indications of the one or more parameters, implicit indications of the one or more parameters, or a look-up table.

6. The first network entity of claim 1, wherein the first network entity is further configured to:

decode the payload of the CSI part 1 before decoding the payload of the CSI part 2.

7. The first network entity of claim 1, wherein the first network entity is further configured to:

receive, from the second network entity, an indication of one or more parameters to apply to the CSI part 1.

8. The first network entity of claim 1, wherein the first network entity is further configured to:

transmit, to the user equipment, one or more of a control message or a configuration message based at least in part on the payload of the CSI part 1 and the CSI part 2.

9. A first network entity for wireless communication, comprising:

a memory; and one or more processors coupled to the memory, wherein the first network entity is configured to:

transmit, to a second network entity, an indication of one or more parameters for decoding channel state information (CSI) that includes a CSI part 1 and a CSI part 2, the CSI part 2 having a length that is based at least in part on a payload of the CSI part 1, wherein the one or more parameters comprise one or more of:

one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths; and receive, from the second network entity, the payload of the CSI part 1 and a decoded payload of the CSI part 2.

10. The first network entity of claim 9, wherein, to transmit the indication of the one or more parameters, the first network entity is configured to:

transmit, to the second network entity, the indication of the one or more parameters via a functional application platform interface.

11. The first network entity of claim 9, wherein the one or more parameters comprise one or more of:

a threshold condition for determination of a length of the CSI part 2;

a mapping of one or more ranks indicated in the CSI part 1 to lengths of portions of the CSI part 2 associated with the one or more ranks;

one or more locations of one or more values within the CSI part 1 for the first network entity to use to determine lengths of portions of the CSI part 2 associated with the one or more values; or lengths of the one or more values within the CSI part 1 for the first network entity to use to determine lengths of portions of the CSI part 2 associated with the one or more values.

12. The first network entity of claim 9, wherein the first network entity is further configured to transmit the one or more parameters via one or more of:

explicit indications of the one or more parameters, implicit indications of the one or more parameters, or a look-up table.

13. The first network entity of claim 9, wherein the first network entity is further configured to:

transmit, to the second network entity, an indication of one or more parameters to apply to the CSI part 1.

14. The first network entity of claim 9, wherein the first network entity comprises a medium access control entity, and wherein the second network entity comprises a physical layer entity.

15. A method of wireless communication performed by a first network entity, comprising:

receiving, from a user equipment, channel state information (CSI) that includes a CSI part 1 and a CSI part 2, the CSI part 2 having a length that is based at least in part on a payload of the CSI part 1; and decoding a payload of the CSI part 2 based at least in part on a payload of the CSI part 1 and one or more parameters indicated by a second network entity associated with the first network entity, wherein the one or more parameters comprise one or more of:

one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths; and providing, to the second network entity, the payload of the CSI part 2 after decoding the payload of the CSI part.

16. The method of claim 15, further comprising:

receiving, from the second network entity, an indication of the one or more parameters.

17. The method of claim 16, wherein receiving, from the second network entity, the indication of the one or more parameters comprises:

receiving, from the second network entity, the indication of the one or more parameters at the first network entity via a functional application platform interface.

18. The method of claim 15, wherein the one or more parameters comprise one or more of:

a threshold condition for determination of a length of the CSI part 2;

a mapping of one or more ranks indicated in the CSI part 1 to lengths of portions of the CSI part 2 associated with the one or more ranks;

one or more locations of one or more values within the CSI part 1 for the first network entity to use to determine lengths of portions of the CSI part 2 associated with the one or more values; or lengths of the one or more values within the CSI part 1 for the first network entity to use to determine lengths of portions of the CSI part 2 associated with the one or more values.

19. The method of claim 18, further comprising receiving, from the second network entity, the one or more parameters via one or more of:

explicit indications of the one or more parameters, implicit indications of the one or more parameters, or a look-up table.

20. The method of claim 15, further comprising:

decoding the payload of the CSI part 1 before decoding the payload of the CSI part 2.

21. The method of claim 15, further comprising: receiving, from the second network entity, an indication of one or more parameters to apply to the CSI part 1.

22. The method of claim 15, further comprising: transmitting, to the user equipment, one or more of a control message or a configuration message based at least in part on the payload of the CSI part 1 and the CSI part 2.

23. A method of wireless communication performed by a first network entity, comprising:

transmitting, to a second network entity, an indication of one or more parameters for decoding channel state information (CSI) that includes a CSI part 1 and a CSI part 2, the CSI part 2 having a length that is based at least in part on a payload of the CSI part 1, wherein the one or more parameters comprise one or more of:

one or more numbers of nonzero coefficients for precoding matrix indicators associated with CSI reports within the CSI part 1, an indication of priorities of elements of the CSI part 2 corresponding to the CSI part 1, or a mapping between at least one non-singular subset of parameter values or sizes and CSI part 2 lengths; and receiving, from the second network entity, the payload of the CSI part 1 and a decoded payload of the CSI part 2.

24. The method of claim 23, wherein transmitting, to the second network entity, the indication of the one or more parameters comprises:

transmitting, to the second network entity, the indication of the one or more parameters via a functional application platform interface.

25. The method of claim 23, wherein the one or more parameters comprise one or more of:

a threshold condition for determination of a length of the CSI part 2;

a mapping of one or more ranks indicated in the CSI part 1 to lengths of portions of the CSI part 2 associated with the one or more ranks;

one or more locations of one or more values within the CSI part 1 for the first network entity to use to determine lengths of portions of the CSI part 2 associated with the one or more values; or lengths of the one or more values within the CSI part 1 for the first network entity to use to determine lengths of portions of the CSI part 2 associated with the one or more values.

26. The method of claim 23, further comprising transmitting, to the second network entity, the one or more parameters via one or more of:

explicit indications of the one or more parameters, implicit indications of the one or more parameters, or a look-up table.

27. The method of claim 23, further comprising:

transmitting, to the second network entity, an indication of one or more parameters to apply to the CSI part 1.

28. The method of claim 23, wherein the first network entity comprises a medium access control entity, and wherein the second network entity comprises a physical layer entity.

29. The first network entity of claim 1, wherein the first network entity comprises a physical layer entity, and wherein the second network entity comprises a medium access control entity.

30. The method of claim 15, wherein the first network entity comprises a physical layer entity, and wherein the second network entity comprises a medium access control entity.

\* \* \* \* \*